(12) United States Patent
Forshey et al.

(10) Patent No.: US 7,426,775 B2
(45) Date of Patent: Sep. 23, 2008

(54) POLYMERIC STRUCTURES COMPRISING A HYDROPHILE/LIPOPHILE SYSTEM

(75) Inventors: Paul Arlen Forshey, Cincinnati, OH (US); Gregory Charles Gordon, Cincinnati, OH (US); Larry Neil Mackey, Fairfield, OH (US); Mark Ryan Richards, Middletown, OH (US)

(73) Assignee: The Procter + Gamble Company, Cincinnati, OH (US)

( * ) Notice: Subject to any disclaimer, the term of this patent is extended or adjusted under 35 U.S.C. 154(b) by 284 days.

(21) Appl. No.: 10/738,943

(22) Filed: Dec. 17, 2003

(65) Prior Publication Data

US 2005/0137331 A1 Jun. 23, 2005

(51) Int. Cl.
*C08F 2/00* (2006.01)
*C08L 29/04* (2006.01)

(52) U.S. Cl. .................... 28/103; 162/109; 162/123; 162/129

(58) Field of Classification Search .................. 28/103; 162/109, 123, 129
See application file for complete search history.

(56) References Cited

U.S. PATENT DOCUMENTS

| 3,619,308 | A | | 11/1971 | Caldwell et al. | |
|---|---|---|---|---|---|
| 4,146,669 | A | * | 3/1979 | Dikler et al. | 428/328 |
| 4,778,847 | A | | 10/1988 | Schornick et al. | |
| 4,880,867 | A | | 11/1989 | Gobel et al. | |
| 5,037,871 | A | | 8/1991 | Jones et al. | |
| 5,179,147 | A | | 1/1993 | Jones et al. | |
| 5,286,770 | A | * | 2/1994 | Bastioli et al. | 524/52 |
| 5,339,796 | A | | 8/1994 | Manker et al. | |
| 5,340,650 | A | * | 8/1994 | Hirakawa et al. | 428/373 |
| 5,412,005 | A | | 5/1995 | Bastioli et al. | |
| 5,419,109 | A | * | 5/1995 | Taniguchi et al. | 57/237 |
| 5,462,980 | A | | 10/1995 | Bastioli et al. | |
| 5,534,150 | A | | 7/1996 | Bastioli et al. | |
| 5,766,758 | A | * | 6/1998 | Hirakawa et al. | 428/364 |
| 6,059,764 | A | * | 5/2000 | Osborn et al. | 604/385.22 |
| 6,180,723 | B1 | | 1/2001 | Keehan | |
| 6,214,907 | B1 | | 4/2001 | Tomka | |
| 2001/0024716 | A1 | * | 9/2001 | Chen et al. | 428/317.9 |
| 2004/0213892 | A1 | * | 10/2004 | Jonas et al. | 427/2.3 |

FOREIGN PATENT DOCUMENTS

| EP | 0 613 050 B1 | 3/1997 |
|---|---|---|
| EP | 0 708 144 B1 | 9/2000 |
| WO | WO 94/03269 | 2/1994 |
| WO | WO 98/02189 | 1/1998 |
| WO | WO 01/46745 | 6/2001 |
| WO | WO 200146745 A1 * | 6/2001 |

* cited by examiner

*Primary Examiner*—Kelechi C Egwim
(74) *Attorney, Agent, or Firm*—C. Brant Cook

(57) ABSTRACT

Polymer melt compositions, especially polymer melt compositions that can be processed into polymeric structures, especially polymeric structures in the form of fibers are provided.

11 Claims, 4 Drawing Sheets

POLYMERIC STRUCTURES COMPRISING A HYDROPHILE/LIPOPHILE SYSTEM

FIELD OF THE INVENTION

The present invention relates to polymer melt compositions, especially polymer melt compositions that can be processed into polymeric structures, especially polymeric structures in the form of fibers.

BACKGROUND OF THE INVENTION

Polymeric structures and polymer melt compositions from which the polymeric structures are obtained are generally known in the art. Particularly, hydroxyl polymer-containing polymeric structures such as starch filaments and/or fibers are generally known in the art. However, starch filaments and/or fibers made by prior art polymer melt compositions and/or polymer processing tend to have a sticky, viscid feeling and are water swellable and/or soluble. Both of these properties of prior art starch filaments and/or fibers negatively impact the use of such filaments and/or fibers in consumer products, especially in products such as fibrous structures and/or sanitary tissue products made from such fibrous structures.

Accordingly, there exists a need to identify polymer melt compositions and/or polymeric structures obtained from such polymer melt compositions that overcome the disadvantages of the prior art polymer melt compositions and/or polymeric structures obtained therefrom.

SUMMARY OF THE INVENTION

The present invention fulfills the needs described above by providing a polymer melt composition and polymeric structures obtained therefrom that do not suffer from the disadvantages present in the prior art polymer melt compositions and polymeric structures obtained therefrom.

In one aspect of the present invention, a polymer melt composition comprising an aqueous mixture comprising a hydroxyl polymer; a hydrophile/lipophile system comprising a hydrophile component and a lipophile component; and a crosslinking system comprising a crosslinking agent; wherein the hydrophile component facilitates dispersibility of the lipophile component in the aqueous mixture is provided. In other words, the hydrophile component allows the lipophile component to be distributed uniformly or substantially uniformly throughout the aqueous mixture.

In another aspect of the present invention, a polymeric structure derived from a polymer melt composition according to the present invention is provided.

In yet another aspect of the present invention, a fibrous structure comprising one or more polymeric structures according to the present invention is provided.

In still another aspect of the present invention, a single- or multi-ply sanitary tissue product comprising a fibrous structure according to the present invention is provided. Preferably, the tissue product exhibits a wet yield stress of from about 1000 to about 6000 Pa at a strain of at least about 1 to about 10 as measured by the Wet Yield Stress Test Method described herein and/or exhibits a wet bulk of at least about 40% and/or at least about 50% of the dry bulk as measured by the Wet Bulk Test Method described herein.

In even another aspect of the present invention, a method for making a polymer melt composition according to the present invention is provided.

In even yet another aspect of the present invention, a method for making a polymeric structure according to the present invention is provided.

In even still yet another aspect of the present invention, a polymeric structure in fiber form produced according to a method of the present invention is provided.

Accordingly, the present invention provides a polymer melt composition, a polymeric structure derived from the polymer melt composition, fibrous structures comprising the polymeric structures, sanitary tissue products comprising the fibrous structures and methods for making the polymer melt composition and the polymeric structure.

DETAILED DESCRIPTION OF THE INVENTION

Methods of the Present Invention

Figure 1A:
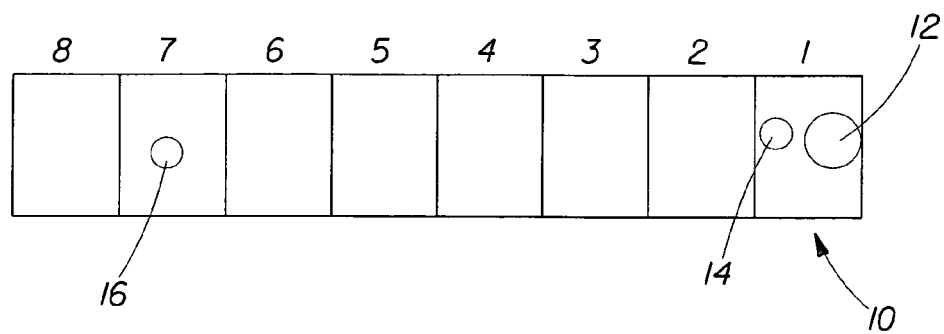
FIG. 1A is a schematic side view of a barrel of a twin screw extruder suitable for use in the present invention.

The methods of the present invention relate to producing polymeric structures from a polymer melt composition comprising a hydroxyl polymer and a hydrophile/lipophile system.

A. Polymer Melt Composition

"Polymer melt composition" as used herein means a composition that comprises a melt processed hydroxyl polymer. "Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

The polymer melt composition may be a composite containing a blend of polymers, wherein at least one is a melt processed hydroxyl polymer according to the present invention, and/or fillers both inorganic and organic, and/or fibers and/or foaming agents.

The polymer melt composition may already be formed or a melt processing step may need to be performed to convert a raw material hydroxyl polymer into a melt processed hydroxyl polymer, thus producing the polymer melt composition. Any suitable melt processing step known in the art may be used to convert the raw material hydroxyl polymer into the melt processed hydroxyl polymer. "Melt processing" as used herein means any operation and/or process by which a polymer is softened to such a degree that it can be brought into a flowable state.

The polymer melt composition may have a shear viscosity, as measured according to the Shear Viscosity of a Polymer Melt Composition Measurement Test Method described herein, of from about 1 Pascal·Seconds to about 300 Pascal·Seconds, preferably from about 2 Pascal·Seconds to about 200 Pascal·Seconds, and more preferably from about 3 Pascal·Seconds to about 150 Pascal·Seconds, as measured at a shear rate of 3,000 $sec^{-1}$ and at the processing temperature (23° C. to 100° C.), depending upon the polymer processing process used to form the polymeric structures from the polymer melt composition.

In one embodiment, the normalized shear viscosity of the polymer melt composition of the present invention must not increase more than 1.3 times the initial shear viscosity value after 70 minutes and/or 2 times the initial shear viscosity value after 130 minutes when measured at a shear rate of 3,000 $sec^{-1}$ according to the Shear Viscosity Change Test Method described herein.

The polymer melt composition may have a temperature of from about 23° C. to about 100° C. and/or from about 65° C. to about 95° C. and/or from about 70° C. to about 90° C. when making fibers from the polymer melt composition. The polymer melt composition temperature is generally higher when making film and/or foam polymeric structures, as described below.

The pH of the polymer melt composition may be from about 2.5 to about 9 and/or from about 3 to about 8.5 and/or from about 3.2 to about 8 and/or from about 3.2 to about 7.5.

In one embodiment, a polymer melt composition of the present invention may comprise from about 30% and/or 40% and/or 45% and/or 50% to about 75% and/or 80% and/or 85% and/or 90% and/or 95% and/or 99.5% by weight of the polymer melt composition of a hydroxyl polymer. The hydroxyl polymer may have a weight average molecular weight greater than about 100,000 g/mol prior to crosslinking.

A crosslinking system may be present in the polymer melt composition and/or may be added to the polymer melt composition before polymer processing of the polymer melt composition.

The polymer melt composition may comprise a) from about 30% and/or 40% and/or 45% and/or 50% to about 75% and/or 80% and/or 85% by weight of the polymer melt composition of a hydroxyl polymer; b) a crosslinking system comprising from about 0.1% to about 10% by weight of the polymer melt composition of a crosslinking agent; and c) from about 10% and/or 15% and/or 20% to about 50% and/or 55% and/or 60% and/or 70% by weight of the polymer melt composition of external plasticizer e.g., water.

The crosslinking system of the present invention may further comprise, in addition to the crosslinking agent, a crosslinking facilitator.

"Crosslinking facilitator" as used herein means any material that is capable of activating a crosslinking agent thereby transforming the crosslinking agent from its unactivated state to its activated state. In other words, when a crosslinking agent is in its unactivated state, the hydroxyl polymer present in the polymer melt composition does not undergo unacceptable crosslinking as determined according to the Shear Viscosity Change Test Method described herein.

When a crosslinking agent in accordance with the present invention is in its activated state, the hydroxyl polymer present in the polymeric structure may, and preferably does, undergo acceptable crosslinking via the crosslinking agent as determined according to the Initial Total Wet Tensile Test Method described herein.

Upon crosslinking the hydroxyl polymer, the crosslinking agent becomes an integral part of the polymeric structure as a result of crosslinking the hydroxyl polymer as shown in the following schematic representation:

Hydroxyl Polymer—Crosslinking
Agent—Hydroxyl—Polymer

The crosslinking facilitator may include derivatives of the material that may exist after the transformation/activation of the crosslinking agent. For example, a crosslinking facilitator salt being chemically changed to its acid form and vice versa.

Nonlimiting examples of suitable crosslinking facilitators include acids having a pKa of between 2 and 6 or salts thereof. The crosslinking facilitators may be Bronsted Acids and/or salts thereof, preferably ammonium salts thereof.

In addition, metal salts, such as magnesium and zinc salts, can be used alone or in combination with Bronsted Acids and/or salts thereof, as crosslinking facilitators.

Nonlimiting examples of suitable crosslinking facilitators include acetic acid, benzoic acid, citric acid, formic acid, glycolic acid, lactic acid, maleic acid, phthalic acid, phosphoric acid, succinic acid and mixtures thereof and/or their salts, preferably their ammonium salts, such as ammonium glycolate, ammonium citrate and ammonium sulfate.

Synthesis of Polymer Melt Composition

A polymer melt composition of the present invention may be prepared using a screw extruder, such as a vented twin screw extruder.

A barrel 10 of an APV Baker (Peterborough, England) twin screw extruder is schematically illustrated in FIG. 1A. The barrel 10 is separated into eight zones, identified as zones 1-8. The barrel 10 encloses the extrusion screw and mixing elements, schematically shown in FIG. 1B, and serves as a containment vessel during the extrusion process. A solid feed port 12 is disposed in zone 1 and a liquid feed port 14 is disposed in zone 1. A vent 16 is included in zone 7 for cooling and decreasing the liquid, such as water, content of the mixture prior to exiting the extruder. An optional vent stuffer, commercially available from APV Baker, can be employed to prevent the polymer melt composition from exiting through the vent 16. The flow of the polymer melt composition through the barrel 10 is from zone 1 exiting the barrel 10 at zone 8.

Figure 1B:
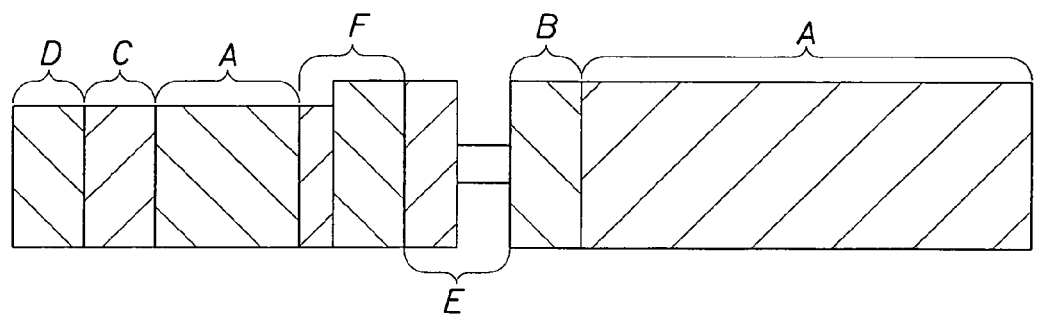
FIG. 1B is a schematic side view of a screw and mixing element configuration suitable for use in the barrel of FIG. 1A.

A screw and mixing element configuration for the twin screw extruder is schematically illustrated in FIG. 1B. The twin screw extruder comprises a plurality of twin lead screws (TLS) (designated A and B) and single lead screws (SLS) (designated C and D) installed in series. Screw elements (A-D) are characterized by the number of continuous leads and the pitch of these leads.

A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and SLS. Screw element A is a TLS with a 1.0 pitch and a 1.5 length ratio. Screw element B is a TLS with a 1.0 pitch and a 1.0 L/D ratio. Screw element C is a SLS with a ¼ pitch and a 1.0 length ratio. Screw element D is a SLS and a ¼ pitch and a ½ length ratio.

Bilobal paddles, E, serving as mixing elements, are also included in series with the SLS and TLS screw elements in order to enhance mixing. Various configurations of bilobal paddles and reversing elements F, single and twin lead screws threaded in the opposite direction, are used in order to control flow and corresponding mixing time.

In zone 1, the hydroxyl polymer is fed into the solid feed port at a rate of 230 grams/minute using a K-Tron (Pitman, N.J.) loss-in-weight feeder. This hydroxyl polymer is combined inside the extruder (zone 1) with water, an external plasticizer, added at the liquid feed at a rate of 146 grams/minute using a Milton Roy (Ivyland, Pa.) diaphragm pump (1.9 gallon per hour pump head) to form a hydroxyl polymer/water slurry. This slurry is then conveyed down the barrel of the extruder and cooked. Table 1 describes the temperature, pressure, and corresponding function of each zone of the extruder.

TABLE I

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 300 | Medium | Pressure Generating | Cooking at Pressure and Temperature |
| 6 | 250 | High | Reversing | Cooking at Pressure and Temperature |
| 7 | 210 | Low | Conveying | Cooling and Conveying (with venting) |
| 8 | 210 | Low | Pressure Generating | Conveying |

After the slurry exits the extruder, part of the melt processed hydroxyl polymer is dumped and another part (100 g) is fed into a Zenith®, type PEP II (Sanford N.C.) and pumped into a SMX style static mixer (Koch-Glitsch, Woodridge, Ill.). The static mixer is used to combine additives such as crosslinking agent, crosslinking facilitator, hydrophile/lipophile system of the present invention, wetting surfactant, external plasticizer, such as water, with the melt processed hydroxyl polymer. The additives are pumped into the static mixer via PREP 100 HPLC pumps (Chrom Tech, Apple Valley MN). These pumps provide high pressure, low volume addition capability. The polymer melt composition of the present invention is ready to be processed by a polymer processing operation.

B. Polymer Processing

"Polymer processing" as used herein means any operation and/or process by which a polymeric structure comprising a processed hydroxyl polymer is formed from a polymer melt composition. Nonlimiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, continuous filament producing and/or tow fiber producing.

A "processed hydroxyl polymer" as used herein means any hydroxyl polymer that has undergone a melt processing operation and a subsequent polymer processing operation.

C. Polymeric Structure

The polymer melt composition can be subjected to one or more polymer processing operations such that the polymer melt composition is processed into a polymeric structure comprising the hydroxyl polymer and a crosslinking system according to the present invention.

"Polymeric structure" as used herein means any physical structure formed as a result of processing a polymer melt composition in accordance with the present invention. Nonlimiting examples of polymeric structures in accordance with the present invention include fibers, films and/or foams.

The crosslinking system via the crosslinking agent crosslinks hydroxyl polymers together to produce the polymeric structure of the present invention, with or without being subjected to a curing step. In other words, the crosslinking system in accordance with the present invention acceptably crosslinks, as determined by the Initial Total Wet Tensile Test Method described herein, the hydroxyl polymers of a processed polymer melt composition together via the crosslinking agent to form an integral polymeric structure. The crosslinking agent is a "building block" for the polymeric structure. Without the crosslinking agent, no polymeric structure in accordance with the present invention could be formed.

Polymeric structures of the present invention do not include coatings and/or other surface treatments that are applied to a pre-existing form, such as a coating on a fiber, film or foam.

In one embodiment, the polymeric structure produced via a polymer processing operation may be cured at a curing temperature of from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the polymeric structure may also be cured at room temperature for days, either after curing at above room temperature or instead of curing at above room temperature.

The polymeric structure may exhibit an initial total wet tensile, as measured by the Initial Total Wet Tensile Test Method described herein, of at least about 1.18 g/cm (3 g/in) and/or at least about 1.57 g/cm (4 g/in) and/or at least about 1.97 g/cm (5 g/in) to about 23.62 g/cm (60 g/in) and/or to about 21.65 g/cm (55 g/in) and/or to about 19.69 g/cm (50 g/in).

In one embodiment, the polymeric structure exhibits a contact angle of less than 40° after 1 second as measured by the Contact Angle Test Method described herein.

The polymeric structures of the present invention may include melt spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

The fibers of the present invention may have a fiber diameter of less than about 50 microns and/or less than about 20 microns and/or less than about 10 microns and/or less than about 8 microns and/or less than about 6 microns and/or less than about 4 microns as measured by the Fiber Diameter Test Method described herein.

In another embodiment, the polymeric structures of the present invention may include a multiconstituent polymeric structure, such as a multicomponent fiber, comprising a hydroxyl polymer of the present invention along with a thermoplastic, water-insoluble polymer. A multicomponent fiber, as used herein, means a fiber having more than one separate part in spatial relationship to one another. Multicomponent fibers include bicomponent fibers, which is defined as a fiber having two separate parts in a spatial relationship to one another. The different components of multicomponent fibers can be arranged in substantially distinct regions across the cross-section of the fiber and extend continuously along the length of the fiber.

A nonlimiting example of such a multicomponent fiber, specifically a bicomponent fiber, is a bicomponent fiber in which the hydroxyl polymer of the present invention represents the core of the fiber and the thermoplastic, water-insoluble polymer represents the sheath, which surrounds or substantially surrounds the core of the fiber. The polymer melt composition from which such a polymeric structure is derived preferably includes the hydroxyl polymer and the thermoplastic, water-insoluble polymer.

In another multicomponent, especially bicomponent fiber embodiment, the sheath may comprise a hydroxyl polymer and a crosslinking system having a crosslinking agent, and the core may comprise a hydroxyl polymer and a crosslinking system having a crosslinking agent. With respect to the sheath and core, the hydroxyl polymer may be the same or different and the crosslinking agent may be the same or different. Further, the level of hydroxyl polymer may be the same or different and the level of crosslinking agent may be the same or different.

One or more polymeric structures of the present invention may be incorporated into a multi-polymeric structure product, such as a fibrous structure and/or web, if the polymeric structures are in the form of fibers. Such a multi-polymeric structure product may ultimately be incorporated into a commercial product, such as a single- or multi-ply sanitary tissue product, such as facial tissue, bath tissue, paper towels and/or wipes, feminine care products, diapers, writing papers, cores, such as tissue cores, and other types of paper products.

Synthesis of Polymeric Structure

Nonlimiting examples of processes for preparing polymeric structures in accordance with the present invention follow.

i) Fiber Formation

Figure 2:
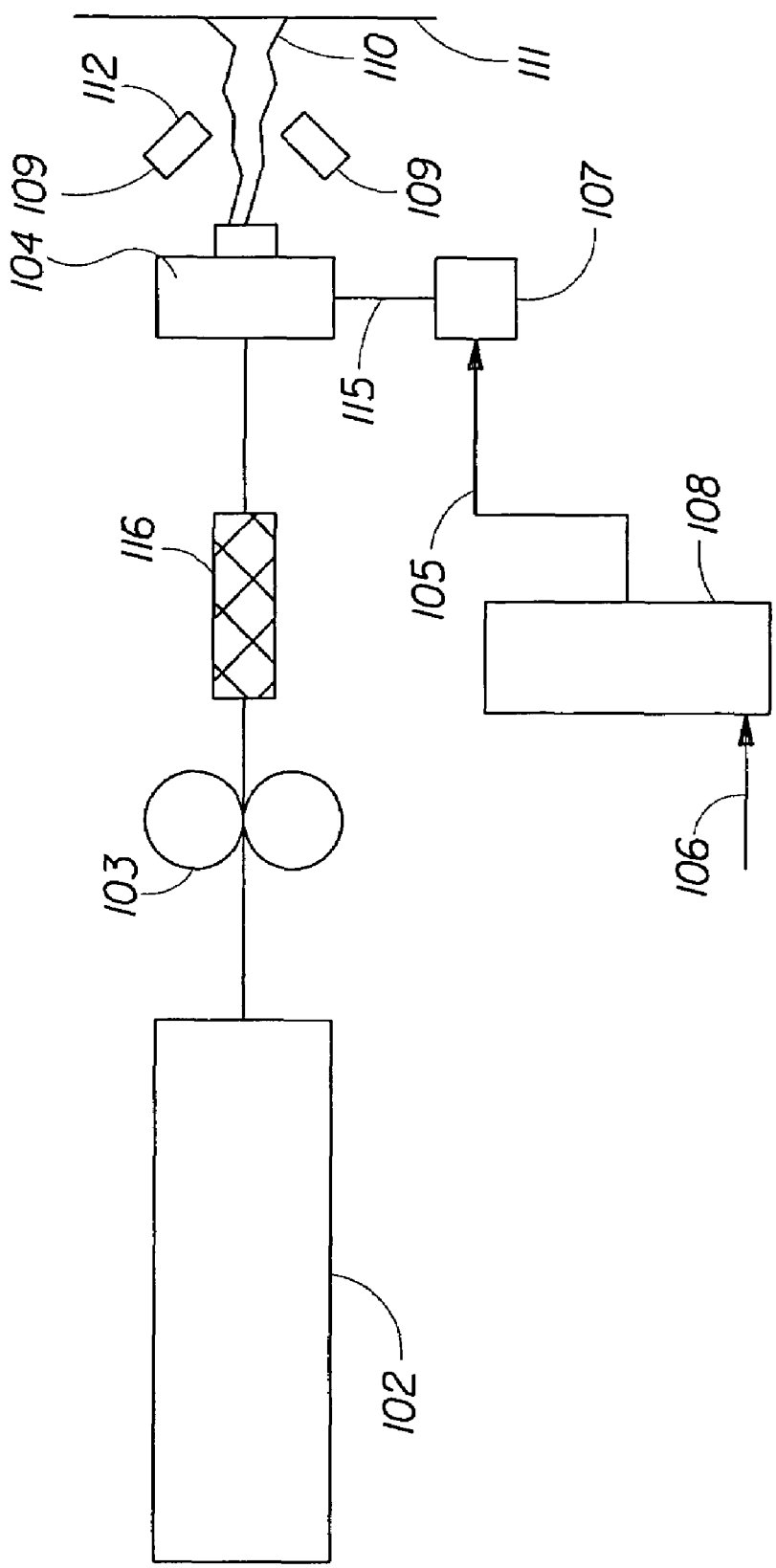
FIG. 2 is a schematic side view of a process for synthesizing a polymeric structure in accordance with the present invention.

A polymer melt composition is prepared according to the Synthesis of a Polymer Melt Composition described above. As shown in FIG. 2, the polymer melt composition may be processed into a polymeric structure. The polymer melt composition present in an extruder 102 is pumped to a die 104 using pump 103, such as a Zenith®, type PEP II, having a capacity of 0.6 cubic centimeters per revolution (cc/rev), manufactured by Parker Hannifin Corporation, Zenith Pumps division, of Sanford, N.C., USA. The hydroxyl polymer's, such as starch, flow to die 104 is controlled by adjusting the number of revolutions per minute (rpm) of the pump 103. Pipes connecting the extruder 102, the pump 103, the die 104, and optionally a mixer 116 are electrically heated and thermostatically controlled to 65° C.

Figure 3:
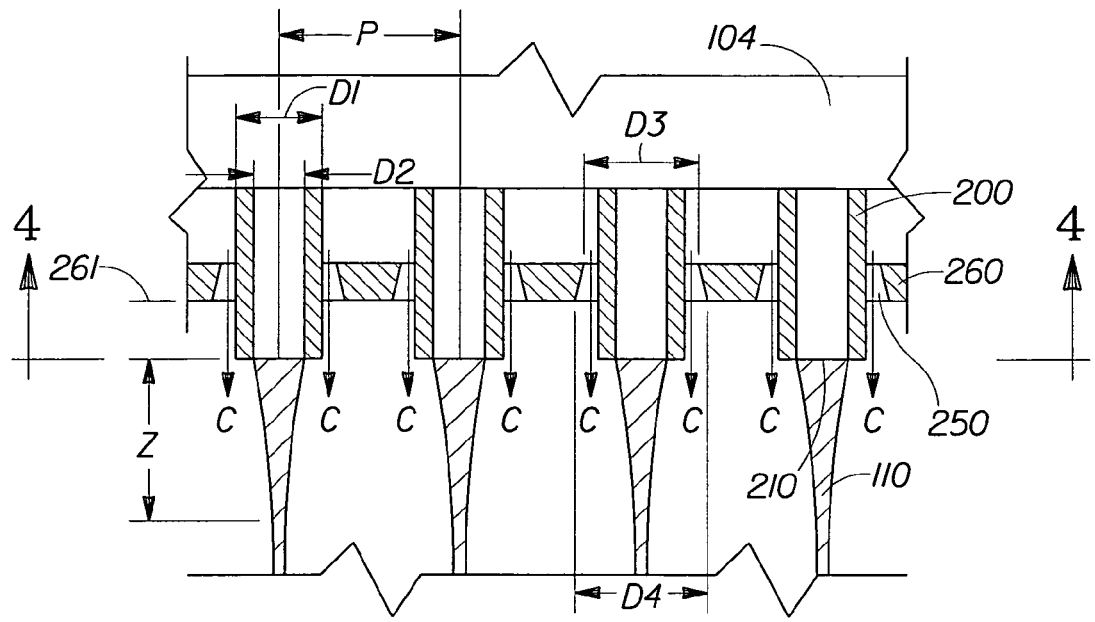
FIG. 3 is a schematic partial side view of the process of the present invention, showing an attenuation zone.
Figure 4:
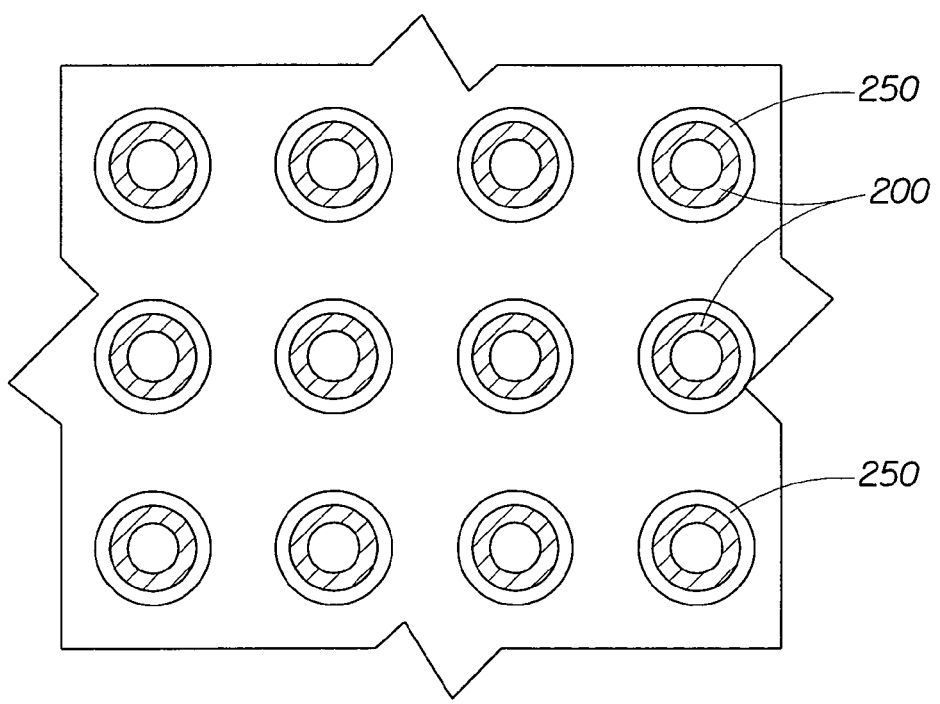
FIG. 4 is a schematic plan view taken along lines 4-4 of FIG. 3 and showing one possible arrangement of a plurality of extrusion nozzles arranged to provide polymeric structures of the present invention.
Figure 5:
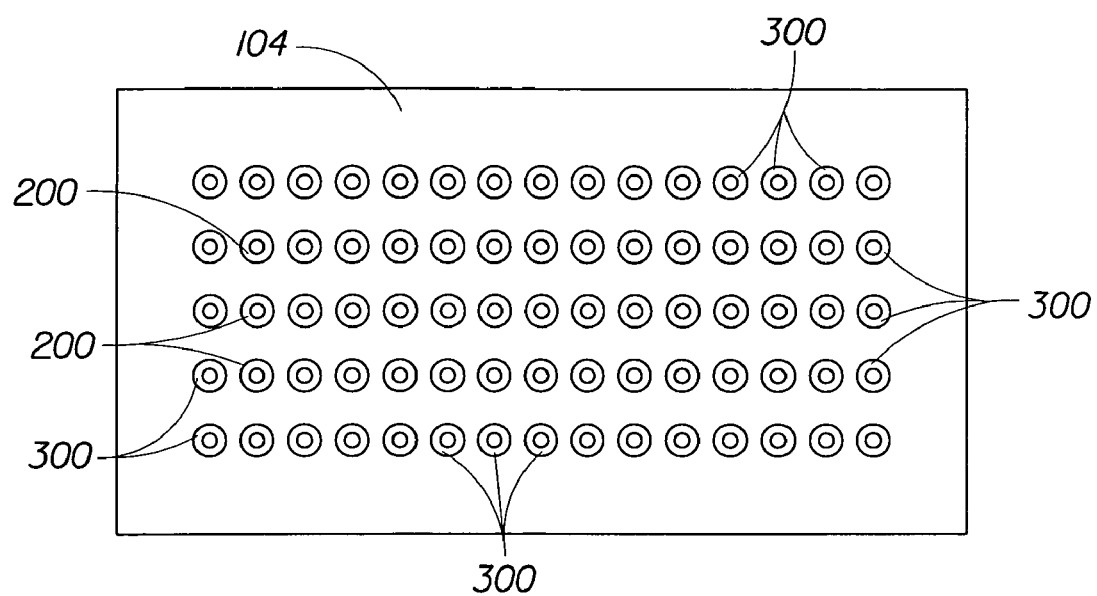
FIG. 5 is a view similar to that of FIG. 4 and showing one possible arrangement of orifices for providing a boundary air around the attenuation zone.

The die 104 has several rows of circular extrusion nozzles 200 spaced from one another at a pitch P (FIG. 3) of about 1.524 millimeters (about 0.060 inches). The nozzles 200 have individual inner diameters D2 of about 0.305 millimeters (about 0.012 inches) and individual outside diameters (D1) of about 0.813 millimeters (about 0.032 inches). Each individual nozzle 200 is encircled by an annular and divergently flared orifice 250 formed in a plate 260 (FIGS. 3 and 4) having a thickness of about 1.9 millimeters (about 0.075 inches). A pattern of a plurality of the divergently flared orifices 250 in the plate 260 correspond to a pattern of extrusion nozzles 200. The orifices 250 have a larger diameter D4 (FIGS. 3 and 4) of about 1.372 millimeters (about 0.054 inches) and a smaller diameter D3 of 1.17 millimeters (about 0.046 inches) for attenuation air. The plate 260 was fixed so that the embryonic fibers 110 being extruded through the nozzles 200 are surrounded and attenuated by generally cylindrical, humidified air streams supplied through the orifices 250. The nozzles can extend to a distance from about 1.5 mm to about 4 mm, and more specifically from about 2 mm to about 3 mm, beyond a surface 261 of the plate 260 (FIG. 3). As shown in FIG. 5, a plurality of boundary-air orifices 300, is formed by plugging nozzles of two outside rows on each side of the plurality of nozzles, as viewed in plane, so that each of the boundary-layer orifice comprised a annular aperture 250 described herein above. Additionally, every other row and every other column of the remaining capillary nozzles are blocked, increasing the spacing between active capillary nozzles As shown in FIG. 2, attenuation air can be provided by heating compressed air from a source 106 by an electrical-resistance heater 108, for example, a heater manufactured by Chromalox, Division of Emerson Electric, of Pittsburgh, Pa., USA. An appropriate quantity of steam 105 at an absolute pressure of from about 240 to about 420 kiloPascals (kPa), controlled by a globe valve (not shown), is added to saturate or nearly saturate the heated air at the conditions in the electrically heated, thermostatically controlled delivery pipe 115. Condensate is removed in an electrically heated, thermostatically controlled, separator 107. The attenuating air has an absolute pressure from about 130 kPa to about 310 kPa, measured in the pipe 115. The polymeric structure fibers 110 being extruded have a moisture content of from about 20% and/or 25% to about 50% and/or 55% by weight. The polymer structure fibers 110 are dried by a drying air stream 109 having a temperature from about 149° C. (about 300° F.) to about 315° C. (about 600° F.) by an electrical resistance heater (not shown) supplied through drying nozzles 112 and discharged at an angle generally perpendicular relative to the general orientation of the embryonic fibers being extruded. The polymeric structure fibers are dried from about 45% moisture content to about 15% moisture content (i.e., from a consistency of about 55% to a consistency of about 85%) and are collected on a collection device 111, such as, for example, a movable foraminous belt.

The process parameters are as follows.

| Sample | Units | |
|---|---|---|
| Attenuation Air Flow Rate | G/min | 2500 |
| Attenuation Air Temperature | ° C. | 93 |
| Attenuation Steam Flow Rate | G/min | 500 |
| Attenuation Steam Gage Pressure | kPa | 213 |
| Attenuation Gage Pressure in Delivery Pipe | kPa | 26 |
| Attenuation Exit Temperature | ° C. | 71 |
| Solution Pump Speed | Revs/min | 35 |
| Solution Flow | G/min/hole | 0.18 |
| Drying Air Flow Rate | g/min | 10200 |
| Air Duct Type | | Slots |
| Air Duct Dimensions | mm | 356 × 127 |
| Velocity via Pitot-Static Tube | M/s | 34 |
| Drying Air Temperature at Heater | ° C. | 260 |
| Dry Duct Position from Die | mm | 80 |
| Drying Duct Angle Relative to Fibers | degrees | 0 | ii) Foam Formation

The polymer melt composition for foam formation is prepared similarly as for fiber formation except that the water content will be less, typically from about 10-21% of the hydroxyl polymer weight. With less water to plasticize the hydroxyl polymer, higher temperatures are needed in extruder zones 5-8 (FIG. 1A), typically from 150-250° C. Also with less water available, it may be necessary to add the crosslinking system, especially the crosslinking agent, with the water in zone 1. In order to avoid premature crosslinking in the extruder, the polymer melt composition pH should be between 7 and 8, achievable by using a crosslinking facilitator e.g., ammonium salt. A die is placed at the location where the extruded material emerges and is typically held at 160-210° C. Modified high amylose starches (for example greater than 50% and/or greater than 75% and/or greater than 90% by weight of the starch of amylose) granulated to particle sizes ranging from 400-1500 microns are preferred for this application. It may also be advantageous to add a nucleating agent such as microtalc or alkali metal or alkaline earth metal salt such as sodium sulfate or sodium chloride in an amount of about 1-8% of the starch weight. The foam may be shaped into various forms.

iii) Film Formation

The polymer melt composition for film formation is prepared similarly as for foam formation except that the added water content is less, typically 3-15% of the hydroxyl polymer weight and a polyol external plasticizer such as glycerol is included at 10-30% of the hydroxyl polymer weight. As with foam formation, zones 5-7 (FIG. 1A) are held at 160-210° C., however, the slit die temperature is lower between 60-120° C. As with foam formation, the crosslinking system, especially the crosslinking agent, may be added along with the water in zone 1 and the polymer melt composition pH should be between 7-8 achievable by using a crosslinking facilitator e.g., ammonium salt.

Hydroxyl Polymers

Hydroxyl polymers in accordance with the present invention include any hydroxyl-containing polymer that can be incorporated into a polymeric structure of the present invention, preferably in the form of a filament.

In one embodiment, the hydroxyl polymer of the present invention includes greater than 10% and/or greater than 20% and/or greater than 25% by weight hydroxyl moieties. Nonlimiting examples of hydroxyl polymers in accordance with the present invention include polyols, such as starch and starch derivatives, cellulose derivatives such as cellulose ether and ester derivatives, chitosan and chitosan derivatives, polyvinylalcohols and various other polysaccharides such as gums, arabinans and galactans.

The hydroxyl polymer preferably has a weight average molecular weight of from about 10,000 to about 40,000,000 g/mol and/or from about 10,000 to about 10,000,000 g/mol. Higher and lower molecular weight hydroxyl polymers may be used in combination with hydroxyl polymers having the preferred weight average molecular weight. "Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

A natural starch can be modified chemically or enzymatically, as well known in the art. For example, the natural starch can be acid-thinned, hydroxy-ethylated or hydroxy-propylated or oxidized.

"Polysaccharides" herein means natural polysaccharides and polysaccharide derivatives or modified polysaccharides. Suitable polysaccharides include, but are not limited to, gums, arabinans, galactans and mixtures thereof.

Polyvinylalcohols which are suitable for use as the hydroxyl polymers (alone or in combination) of the present invention can be characterized by the following general formula:

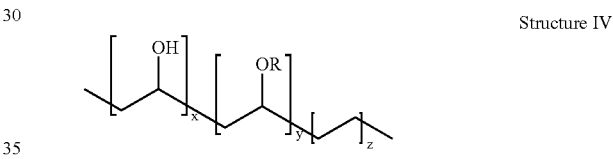

Structure IV each R is selected from the group consisting of $C_1$-$C_4$ alkyl; $C_1$-$C_4$ acyl; and $x/x+y+z=0.5$-$1.0$.

Hydrophile/Lipophile System

The hydrophile/lipophile system of the present invention comprises a hydrophile component and a lipophile component. The hydrophile/lipophile system exhibits a Tg of less than about 40° and/or less than about 25° to about −30° C. and/or to about −15° C.

Nonlimiting examples of hydrophile/lipophile systems comprise an ingredient selected from the group consisting of: latex grafted starches, styrene/butadiene latexes, vinyl/acrylic latexes, acrylic latexes, acrylate modified latexes, water dispersible fluoropolymers, water dispersible silicones and mixtures thereof In one embodiment, the hydrophile/lipophile system exhibits an average particle size (as measured by LB 500, commercially available from Horiba International, Irving, Calif.) of from about 10 nm and/or from about 75 nm and/or from about 100 nm to about 6 μm and/or to about 3 μm and/or to about 1.5 μm. In one embodiment, the hydrophile/lipophile system exhibits an average particle size of from about 10 nm to about 6 μm.

In one embodiment, the hydrophile component and the lipophile component are covalently bonded together.

In another embodiment, the hydrophile component and the lipophile component are not covalently bonded together.

In one embodiment, the hydrophile component and the lipophile component are present in the hydrophile/lipophile system at a weight percent hydrophile component to weight percent lipophile component of from about 30:70 to about 1:99 and/or from about 20:80 to about 5:95.

In still another embodiment, the hydrophile/lipophile system is present in the polymer melt composition of the present invention at a level of from about 0.5% and/or from about 1% to about 3% and/or to about 10% by weight of the starch.

In one embodiment, the hydrophile/lipophile system comprises a discontinuous phase within the hydroxyl polymer. In other words, the hydroxyl polymer may be present in a continuous phase and the hydrophile/lipophile system may be present in a discontinuous phase within the continuous phase of the hydroxyl polymer.

a. Hydrophile Component

Nonlimiting examples of suitable hydrophile components are selected from the group consisting of: alkylaryl sulfonates, ethoxylated alcohols, ethoxylated alkylphenols, ethoxylated amines, ethoxylated fatty acids, ethoxylated fatty esters and oils, glycerol esters, propoxylated & ethoxylated fatty acids, propoxylated & ethoxylated fatty alcohols, propoxylated & ethoxylated alkyl phenols, quaternary surfactants, sorbitan derivitaives, alcohol sulfates, ethoxylated alcohol sulfates, sulfosuccinates and mixtures thereof.

b. Lipophile Component

Nonlimiting examples of suitable lipophile components are selected from the group consisting of: saturated and unsaturated animal and vegetable oils, mineral oil, petrolatum, natural and synthetic waxes and mixtures thereof.

c. Surfactant Component

The hydrophile/lipophile system of the present invention may comprise a surfactant component. A nonlimiting example of a suitable surfactant component includes siloxane-based surfactants and organosulfosuccinate surfactants.

One class of suitable surfactant component materials can include siloxane-based surfactants (siloxane-based materials). The siloxane-based surfactants in this application may be siloxane polymers for other applications. The siloxane-based surfactants typically have a weight average molecular weight from 500 to 20,000 g/mol. Such materials, derived from poly(dimethylsiloxane), are well known in the art.

Nonlimiting commercially available examples of suitable siloxane-based surfactants are TSF 4446 and Nu Wet 550 and 625, and XS69-B5476 (commercially available from General Electric Silicones); Jenamine HSX (commercially available from DelCon), Silwet L7087, L7200, L8620, L77 and Y12147 (commercially available from OSi Specialties).

A second preferred class of suitable surfactant component materials is organic in nature. Preferred materials are organosulfosuccinate surfactants, with carbon chains of from about 6 to about 20 carbon atoms. Most preferred are organosulfosuccinates containing dialkly chains, each with carbon chains of from about 6 to about 20 carbon atoms. Also preferred are chains containing aryl or alkyl aryl, substituted or unsubstituted, branched or linear, saturated or unsaturated groups.

Nonlimiting commercially available examples of suitable organosulfosuccinate surfactants are available under the trade names of Aerosol OT and Aerosol TR-70 (ex. Cytec).

In one embodiment, the surfactant, when present, may be present in the polymer melt composition of the present invention at a level of from about 0.01% to about 0.5% and/or from about 0.025% to about 0.4% and/or from about 0.05% to about 0.30% by weight of the starch.

Crosslinking System

"Crosslinking system" as used herein means a crosslinking system that comprises a crosslinking agent and optionally a crosslinking facilitator wherein a polymer melt composition within which the crosslinking system is present exhibits less than a 1.3 times normalized shear viscosity change after 70 minutes and/or less than a 2 times normalized shear viscosity change after 130 minutes according to the Shear Viscosity Change Test Method described herein. Crosslinking agents and/or crosslinking systems that do not satisfy this test methods do not fall within the scope of the present invention.

Preferably, a polymeric structure produced from the polymer melt composition comprising the crosslinking system of the present invention exhibits an initial total wet tensile, as measured by the Initial Total Wet Tensile Test Method described herein, of at least about 1.18 g/cm (3 g/in) and/or at least about 1.57 g/cm (4 g/in) and/or at least about 1.97 g/cm (5 g/in) to about 23.62 g/cm (60 g/in) and/or to about 21.65 g/cm (55 g/in) and/or to about 19.69 g/cm (50 g/in).

The level of crosslinking agent, type of crosslinking agent, level of crosslinking facilitator, if any, and type of crosslinking facilitator, if any, within the crosslinking system of the present invention are factors that may impact whether the crosslinking system is unacceptable under the Shear Viscosity Change Test Method and/or provides acceptable crosslinking of a hydroxyl polymer under the Initial Total Wet Tensile Test Method.

"Crosslinking agent" as used herein means any material that is capable of crosslinking a hydroxyl polymer within a polymer melt composition according to the present.

Nonlimiting examples of suitable crosslinking agents include compounds resulting from alkyl substituted or unsubstituted cyclic adducts of glyoxal with ureas (Structure V, X=O), thioureas (Structure V, X=S), guanidines (Structure V, X=NH, N-alkyl), methylene diamides (Structure VI), and methylene dicarbamates (Structure VII) and derivatives thereof; and mixtures thereof.

In one embodiment, the crosslinking agent has the following structure:

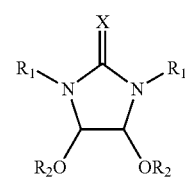

Structure V wherein X is O or S or NH or N-alkyl, and $R_1$ and $R_2$ are independently

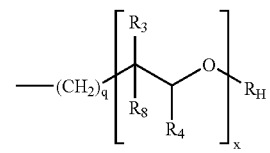

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In another embodiment, the crosslinking agent has the following structure:

Structure VI

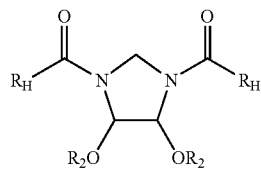

wherein $R_2$ is independently

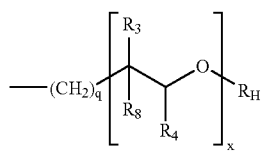

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ are independently selected from the group consisting of: H, linear or branched $C_1$-$C_4$ alkyl, and mixtures thereof.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In still another embodiment, the crosslinking agent has the following structure:

Structure VII

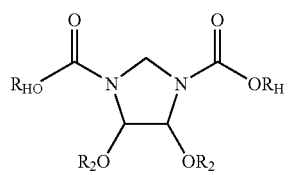

wherein $R_2$ is independently

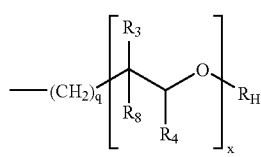

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ are independently selected from the group consisting of: H, linear or branched $C_1$-$C_4$ alkyl, and mixtures thereof.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In yet other embodiments, the crosslinking agent has one of the following structures (Structure VIII, IX and X):

Structure VIII

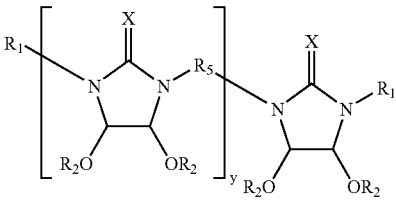

wherein X is O or S or NH or N-alkyl, and $R_1$ and $R_2$ are independently

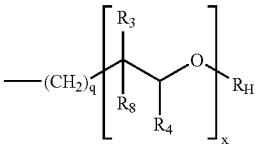

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof; x is 0-100; y is 1-50; $R_5$ is independently selected from the group consisting of: —$(CH_2)_n$— wherein n is 1-12, —$(CH_2CH(OH)CH_2)$—,

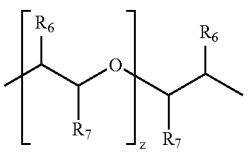

wherein $R_6$ and $R_7$ are independently selected from the group consisting of: H, linear or branched $C_1$-$C_4$ alkyl and mixtures thereof, wherein $R_6$ and $R_7$ cannot both be $C_1$-$C_4$ alkyl within a single unit; and z is 1-100.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

The crosslinking agent may have the following structure:

Structure IX

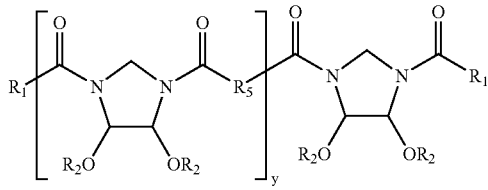

wherein $R_1$ and $R_2$ are independently

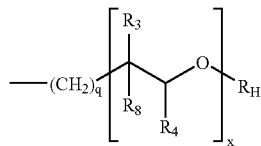

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof; x is 0-100; and q is 0-10, $R_H$ is independently selected from the group consisting of: H, linear or branched $C_1$-$C_4$ alkyl, and mixtures thereof; x is 1-100; y is 1-50; $R_5$ is independently —$(CH_2)_n$— wherein n is 1-12.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In even another embodiment, the crosslinking agent has the following structure:

Structure X

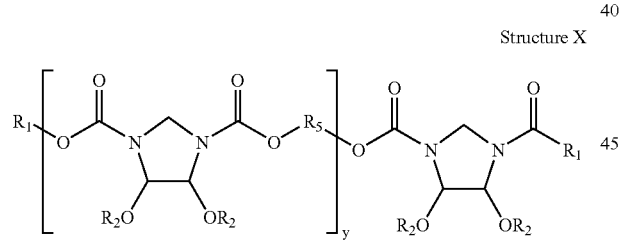

wherein $R_1$ and $R_2$ are independently

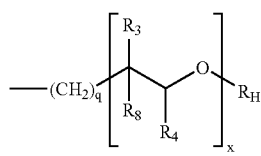

wherein $R_3$ and $R_8$ are independently selected from the group consisting of: H, linear or branched $C_1$-$C_4$ alkyl, $CH_2OH$ and mixtures thereof, $R_4$ is independently selected from the group consisting of: H, linear or branched $C_1$-$C_4$ alkyl, and mixtures thereof, x is 0-100; and q is 0-10, $R_H$ is independently selected from the group consisting of: H, linear or branched $C_1$-$C_4$ alkyl, and mixtures thereof; x is 1-100; y is 1-50; $R_5$ is independently selected from the group consisting of: —$(CH_2)_n$— wherein n is 1-12, —$(CH_2CH(OH)CH_2)$—,

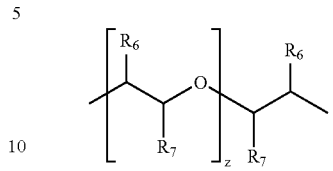

wherein $R_6$ and $R_7$ are independently selected from the group consisting of: H, linear or branched $C_1$-$C_4$ alkyl and mixtures thereof, wherein $R_6$ and $R_7$ cannot both be $C_1$-$C_4$ alkyl within a single unit; and z is 1-100.

In one embodiment, $R_3$, $R_8$ and $R_4$ are not all $C_1$-$C_4$ alkyl in a single unit.

In yet another embodiment, only one of $R_3$, $R_8$ and $R_4$ is $C_1$-$C_4$ alkyl in a single unit.

In one embodiment, the crosslinking agent comprises an imidazolidinone (Structure V, X=O) where $R_2$=H, Me, Et, Pr, Bu, $(CH_2CH_2O)_pH$, $(CH_2CH(CH_3)O)_pH$, $(CH(CH_3)CH_2O)_pH$ where p is 0-100 and $R_1$=methyl. A commercially available crosslinking agent discussed above; namely, Fixapret NF from BASF, has $R_1$=methyl, $R_2$=H.

In another embodiment, the crosslinking agent comprises an imidazolidinone (Structure V, X=O) where $R_2$=H, Me, Et, Pr, Bu and $R_1$=H. Dihydroxyethyleneurea (DHEU) comprises an imidazolidinone (Structure V, X=O) where both $R_1$ and $R_2$ are H. DHEU can be synthesized according to the procedure in EP Patent 0 294 007 A1.

Not being bound by theory, the crosslinking system functions by linking hydroxyl polymer chains together via amidal linkages as depicted in the following structure. After crosslinking the crosslinker is part of the polymeric structure.

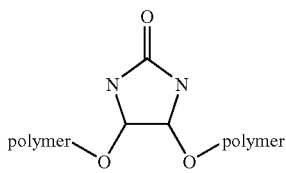

One of ordinary skill in the art understands that in all the formulas above, the carbons to which the $OR_2$ moiety is bonded, also are bonded to a H, which is not shown in the structures for simplicity reasons.

Nonlimiting examples of commercially available crosslinking agents which are not part of the invention because they are unacceptable as determined by the Shear Viscosity Change Test Method and/or the Initial Total Wet Tensile Test Method described herein include Permafresh EFC (available from OMNOVA Solutions, Inc), Fixapret ECO (available from BASF) and Parez 490 (available from Bayer Corporation).

Methods for Making A Polymer Melt Composition

In one embodiment, a method for making a polymer melt composition comprising the steps of:
a. providing an aqueous mixture comprising a melt processed hydroxyl polymer; and
b. adding a hydrophile/lipophile system to the aqueous mixture, wherein the hydrophile/lipophile system comprises a hydrophile component and a lipophile component wherein the hydrophile component facilitates dispersibility of the lipophile component into the aqueous mixture; and c. adding a crosslinking system comprising a crosslinking agent to the aqueous mixture, is provided.

In another embodiment, a method for making a polymeric structure comprising the steps of:

a. providing an polymer melt composition comprising an aqueous mixture comprising a hydroxyl polymer, a hydrophile/lipophile system comprising a hydrophile component and a lipophile component wherein the hydrophile component facilitates the dispersibility of the lipophile component into the aqueous mixture and a crosslinking system comprising a crosslinking agent; and b. polymer processing the polymer melt composition to form the polymeric structure, is provided.

Test Methods

A. Shear Viscosity of a Polymer Melt Composition Measurement Test Method

The shear viscosity of a polymer melt composition of the present invention is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polymer melt composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta = K\gamma^{n-1}$, wherein K is the material's viscosity constant, n is the material's thinning index and $\gamma$ is the shear rate. The reported apparent shear viscosity of the composition herein is calculated from an interpolation to a shear rate of 3,000 sec$^{-1}$ using the power law relation.

B. Shear Viscosity Change Test Method

Viscosities of three samples of a single polymer melt composition of the present invention comprising a crosslinking system to be tested are measured by filling three separate 60 cc syringes; the shear viscosity of one sample is measured immediately (initial shear viscosity) (it takes about 10 minutes from the time the sample is placed in the rheometer to get the first reading) according to the Shear Viscosity of a Polymer Melt Composition Measurement Test Method. If the initial shear viscosity of the first sample is not within the range of 5-8 Pascal·Seconds as measured at a shear rate of 3,000 sec$^{-1}$, then the single polymer melt composition has to be adjusted such that the single polymer melt composition's initial shear viscosity is within the range of 5-8 Pascal·Seconds as measured at a shear rate of 3,000 sec$^{-1}$ and this Shear Viscosity Change Test Method is then repeated. Once the initial shear viscosity of the polymer melt composition is within the range of 5-8 Pascal·Seconds as measured at a shear rate of 3,000 sec-1, then the other two samples are measured by the same test method after being stored in a convection oven at 80° C. for 70 and 130 minutes, respectively. The shear viscosity at 3000 sec$^{-1}$ for the 70 and 130 minute samples is divided by the initial shear viscosity to obtain a normalized shear viscosity change for the 70 and 130 minute samples. If the normalized shear viscosity change is 1.3 times or greater after 70 minutes and/or is 2 times or greater after 130 minutes, then the crosslinking system within the polymer melt composition is unacceptable, and thus is not within the scope of the present invention. However, if the normalized shear viscosity change is less than 1.3 times after 70 minutes and/or (preferably and) is less than 2 times after 130 minutes, then the crosslinking system is not unacceptable, and thus it is within the scope of the present invention with respect to polymer melt compositions comprising the crosslinking system. Preferably, the crosslinking system is acceptable with respect to polymeric structures derived from polymer melt compositions comprising the crosslinking system as determined by the Initial Total Wet Tensile Test Method.

Preferably, the normalized shear viscosity changes will be less than 1.2 times after 70 minutes and/or less than 1.7 times after 130 minutes; more preferably less than 1.1 times after 70 minutes and/or less than 1.4 times after 130 minutes.

C. Initial Total Wet Tensile Test Method

An electronic tensile tester (Thwing-Albert EJA Materials Tester, Thwing-Albert Instrument Co., 10960 Dutton Rd., Philadelphia, Pa., 19154) is used and operated at a crosshead speed of 4.0 inch (about 10.16 cm) per minute and a gauge length of 1.0 inch (about 2.54 cm), using a strip of a polymeric structure of 1 inch wide and a length greater than 3 inches long. The two ends of the strip are placed in the upper jaws of the machine, and the center of the strip is placed around a stainless steel peg (0.5 cm in diameter). After verifying that the strip is bent evenly around the steel peg, the strip is soaked in distilled water at about 20° C. for a soak time of 5 seconds before initiating cross-head movement. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and calculations in the following manner:

Initial Total Wet Tensile=ITWT(g/inch)=Peak Load$_{MD}$(g$_f$)/2 (inch$_{width}$)+Peak Load$_{CD}$(g$_f$)/2 (inch$_{width}$)

The Initial Total Wet Tensile value is then normalized for the basis weight of the strip from which it was tested. The normalized basis weight used is 36 g/m$^2$, and is calculated as follows:

Normalized {ITWT}={ITWT}*36 (g/m$^2$)/Basis Weight of Strip(g/m$^2$)

If the initial total wet tensile of a polymeric structure comprising a crosslinking system of the present invention is at least 1.18 g/cm (3 g/in) and/or at least 1.57 g/cm (4 g/in) and/or at least 1.97 g/cm (5 g/in), then the crosslinking system is acceptable and is within the scope of the present invention. Preferably, the initial total wet tensile is less than or equal to about 23.62 g/cm (60 g/in) and/or less than or equal to about 21.65 g/cm (55 g/in) and/or less than or equal to about 19.69 g/cm (50 g/in).

D. Contact Antile Test Method

Contact angle testing is performed on a Fibro DAT high speed contact angle measurement device supplied by Thwing Albert Instrument Company. The test is run to a timeout of 0.1 minutes and applies a 32 micro-liter drop of water on the surface of a fibrous structure sample. The high speed images obtained by the Fibro DAT are then computer analyzed generating a graphical representation of contact angle vs. time. An average of five measures is taken and the contact angle at time equals one second is used as the reference point. Therefore, a contact angle of 40° after 1 second means that the contact angle is measured 1 second after the reference point is measured.

E. Wet Bulk Test Method

For the purposes of this document "wet bulk" is defined as the ratio of the initial height of a stack of sample squares of dry fibrous structures to the height of the same stack after the stack has been thoroughly wetted. The height of the stack is measured with the aid of a digital micrometer (Mitutoyo Series 543 Absolute Digimatic Indicator, Mitutoyo Corporation, Kanagawa, Japan) supported on a stable test stand. The internal spring of the micrometer must be disconnected so as to minimize loading on the stack. The micrometer is fitted with a 1 inch diameter test foot. Other equipment needed include a Petri dish having a diameter of 100 mm×15 mm and a section of non-stick Teflon®mesh having openings of approximately 0.25 in (0.635 cm) coarse nylon screen cut to fit inside the Petri dish, both items are commercially available from VWR Scientific.

The test procedure includes the following steps. The screen is placed inside the Petri dish and the Petri dish is placed on the base of the test stand—centered under the micrometer test foot. The micrometer assembly is then lowered until the test foot comes into contact with the screen. The micrometer is then zeroed. The fibrous structure(s) to be tested is cut into 1 inch×1 inch (2.54 cm×2.54 cm) sample squares. After raising the micrometer test foot, eight (8) sample squares are stacked one on top of the other in a uniform arrangement and placed on the screen in the Petri dish under the micrometer test foot. The micrometer test foot is then gently lowered onto the stack of sample squares. The initial micrometer reading is then recorded. Next, 50 ml of deionized water is slowly added in a controlled manner such that all 50 ml are added over a period of about 3 seconds to the Petri dish such that little or no water contacts the stack of square samples as a result of the addition. After 30 seconds the final height of the stack of sample squares is recorded. If the entire stack of sample squares is fully wetted (no dry spots within the samples that would affect the reading) the measurement is over. If the entire stack of sample squares is not fully wetted wait an additional 60 seconds then record the final height, the measurement is then over. If the entire stack of sample squares is still not fully wetted abort the test and record that the stack of samples squares was not fully wetted. Repeat test, if necessary.

Calculate the wet bulk by dividing the final height of the stack of sample squares by the initial height of the stack of sample squares and multiply by 100% which provides the wet bulk of the fibrous structure as a percent of dry bulk.

F. Wet Yield Stress Test Method

Fibrous structure samples to be measured are cut into 20 mm disks and weighed to the nearest 0.1 mg. The stack of fibrous structure disks are loaded and centered in the sample cup of a Reologica Stresstech rheometer equipped with a Sealed Cell. The rheometer fixture is a 20 mm diameter parallel plate fixture with serrations of 0.3 mm deep and 0.6 mm apart. Water is added to the sample using a 1000 µL mechanical pipette (Eppendorf Pippetteman) such that the ratio of water mass to fibrous structure mass is 3.5. The sample is then placed in the rheometer and the cell pressure is brought up to 10 psig. To run the test, the normal force sensor of the rheometer is zeroed and the gap between the two parallel plates is reduced until the normal force exerted by the top plate is 3 Newtons. At this point, the gap is held constant for the duration of the test. After a 30 second equilibration time, the Wet Yield Stress Test is commenced with the following settings:

| | |
|---|---|
| Initial gap: | 4 mm |
| gap for speed limit of head approach | 3 mm |
| limiting speed of head approach | 0.0305 mm/s |
| Equilibration time before starting stress ramp | 30 seconds |
| stress ramp | 5 to 10,000 Pa, Logarithmically |
| Time for stress ramp | 340 seconds |
| measurement steps | 34 |
| position resolution setting | Auto |
| inertial compensation | 100% |
| maximum allowed shear rate | 300 s$^{-1}$ |

The test results in a graph of stress vs. strain. Read the Wet Yield Stress number off the graph and/or rheometer for a particular Strain.

Method F. Fiber Diameter Test Method

A web comprising fibers of appropriate basis weight (approximately 5 to 20 grams/square meter) is cut into a rectangular shape, approximately 20 mm by 35 mm. The sample is then coated using a SEM sputter coater (EMS Inc, Pa., USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 µm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.3) and the MATLAB Image Processing Tool Box (Version 3.)The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

All documents cited in the Detailed Description of the Invention are, in relevant part, incorporated herein by reference; the citation of any document is not to be considered as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A single- or multi-ply sanitary tissue product comprising a fibrous structure comprising one or more fibers formed from a polymer melt composition comprising:
   a. a continuous phase comprising an aqueous mixture comprising a hydroxyl polymer comprising a polysaccharide selected from the group consisting of starch, starch derivatives and mixtures thereof;
   b. a discontinuous phase comprising a hydrophile/lipophile system comprising a hydrophile component and a lipophile component; and
   c. a crosslinking system comprising a crosslinking agent; wherein the hydrophile component facilitates dispersibility of the lipophile component in the aqueous mixture and wherein the crosslinking agent becomes an integral part of the fiber by crosslinking the hydroxyl polymer after polymer processing of the polymer melt composition into a fiber.

2. The single- or multi-ply sanitary tissue product according to claim 1 wherein the one or more fibers exhibits a contact angle of less than about 40° after 1 second.

3. The single- or multi-ply sanitary tissue product according to claim 1 wherein the one or more fibers has a diameter of less than about 50 μm.

4. The single- or multi-ply sanitary tissue product according to claim 1 wherein the tissue product exhibits a wet yield stress of from about 1000 to about 6000 Pa at a strain of at least about 1 to about 10.

5. The single- or multi-ply sanitary tissue product according to claim 1 wherein the tissue product exhibits a wet bulk of at least about 40% of the dry bulk.

6. The single- or multi-ply sanitary tissue product according to claim 1 wherein the polysaccharide has a weight average molecular weight of from about 10,000 to about 40,000,000 g/mol.

7. The single- or multi-ply sanitary tissue product according to claim 1 wherein the hydrophile component is covalently bonded to the lipophile component.

8. The single- or multi-ply sanitary tissue product according to claim 1 wherein the crosslinking agent is selected from the group consisting of polycarboxylic acids, imidazolidinones and mixtures thereof.

9. The single- or multi-ply sanitary tissue product according to claim 1 wherein the crosslinking system further comprises a crosslinking facilitator.

10. The single- or multi-ply sanitary tissue product according to claim 1 wherein the hydrophile/lipophile system further comprises a surfactant component.

11. The single- or multi-ply sanitary tissue product according to claim 10 wherein the surfactant component comprises an organosulfosuccinate surfactant.

* * * * *

UNITED STATES PATENT AND TRADEMARK OFFICE
CERTIFICATE OF CORRECTION

PATENT NO. : 7,426,775 B2 Page 1 of 1
APPLICATION NO. : 10/738943
DATED : September 23, 2008
INVENTOR(S) : Paul Arlen Forshey It is certified that error appears in the above-identified patent and that said Letters Patent is hereby corrected as shown below:

In Col. 4, line 10 the words "Hydroxyl-Polymer" should be Hydroxyl polymer

In Col. 18, line 65, the word "Antile" should be Angle

Signed and Sealed this

Twenty-sixth Day of May, 2009

JOHN DOLL
*Acting Director of the United States Patent and Trademark Office*